(12) United States Patent
Walkingshaw et al.

(10) Patent No.: US 11,025,959 B2
(45) Date of Patent: *Jun. 1, 2021

(54) PROBABILISTIC MODEL TO COMPRESS IMAGES FOR THREE-DIMENSIONAL VIDEO

(71) Applicant: Verizon Patent and Licensing Inc., Basking Ridge, NJ (US)

(72) Inventors: Andrew Walkingshaw, Palo Alto, CA (US); Arthur van Hoff, Palo Alto, CA (US); Daniel Kopeinigg, Palo Alto, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,613

(22) Filed: Sep. 3, 2019

(65) Prior Publication Data

US 2019/0394492 A1 Dec. 26, 2019

Related U.S. Application Data

(63) Continuation of application No. 15/617,878, filed on Jun. 8, 2017, now Pat. No. 10,440,398, which is a
(Continued)

(51) Int. Cl.
*H04N 19/86* (2014.01)
*H04N 19/162* (2014.01)
(Continued)

(52) U.S. Cl.
CPC ......... *H04N 19/86* (2014.11); *H04N 13/139* (2018.05); *H04N 13/368* (2018.05);
(Continued)

(58) Field of Classification Search
CPC .... H04N 19/86; H04N 13/368; H04N 13/139; H04N 19/167; H04N 19/17; H04N 19/162; H04N 19/597; H04N 13/366
See application file for complete search history.

(56) References Cited

U.S. PATENT DOCUMENTS

| 4,507,683 A | 3/1985 | Griesshaber et al. |
| 5,495,576 A | 2/1996 | Ritchey |

(Continued)

FOREIGN PATENT DOCUMENTS

| RU | 2382406 | 2/2010 |
| RU | 2421933 | 6/2011 |
| WO | 2012/113988 | 8/2012 |

OTHER PUBLICATIONS

Mase, et al., "Socially assisted multi-view video viewer", Proceedings of the 13th International Conference on Multimodal Interfaces, ACM, Nov. 2011, pp. 319-322.

*Primary Examiner* — Tat C Chio

(57) ABSTRACT

A method includes receiving head-tracking data that describe one or more positions of people while the people are viewing a three-dimensional video. The method further includes generating a probabilistic model of the one or more positions of the people based on the head-tracking data, wherein the probabilistic model identifies a probability of a viewer looking in a particular direction as a function of time. The method further includes generating video segments from the three-dimensional video. The method further includes, for each of the video segments: determining a directional encoding format that projects latitudes and longitudes of locations of a surface of a sphere onto locations on a plane, determining a cost function that identifies a region of interest on the plane based on the probabilistic model, and generating optimal segment parameters that minimize a sum-over position for the region of interest.

20 Claims, 6 Drawing Sheets

Related U.S. Application Data continuation-in-part of application No. 15/269,734, filed on Sep. 19, 2016, now Pat. No. 9,774,887, and a continuation-in-part of application No. 14/842,465, filed on Sep. 1, 2015, now Pat. No. 10,701,426, which is a continuation-in-part of application No. 14/726,118, filed on May 29, 2015, now Pat. No. 9,911,454, and a continuation-in-part of application No. 14/444,938, filed on Jul. 28, 2014, now Pat. No. 9,451,162.

(60) Provisional application No. 62/142,909, filed on Apr. 3, 2015, provisional application No. 62/055,259, filed on Sep. 25, 2014.

(51) Int. Cl.
| | |
|---|---|
| *H04N 19/167* | (2014.01) |
| *H04N 19/17* | (2014.01) |
| *H04N 19/597* | (2014.01) |
| *H04N 13/139* | (2018.01) |
| *H04N 13/368* | (2018.01) |
| *H04N 13/366* | (2018.01) |

(52) U.S. Cl.
CPC ......... *H04N 19/162* (2014.11); *H04N 19/167* (2014.11); *H04N 19/17* (2014.11); *H04N 19/597* (2014.11); *H04N 13/366* (2018.05)

(56) References Cited

U.S. PATENT DOCUMENTS

| | | | |
|---|---|---|---|
| 6,128,108 A | 10/2000 | Teo | |
| 6,141,034 A | 10/2000 | McCutchen | |
| 6,212,468 B1 | 4/2001 | Nakayama et al. | |
| 6,747,644 B1* | 6/2004 | Deering ............... | G06T 9/001 345/420 |
| 6,767,287 B1 | 7/2004 | Mcquaid et al. | |
| 6,865,289 B1 | 3/2005 | Berestov | |
| 7,155,680 B2 | 12/2006 | Akazawa et al. | |
| 7,884,848 B2 | 2/2011 | Ginther | |
| 8,478,111 B2 | 7/2013 | Stankiewicz et al. | |
| 8,581,961 B2 | 11/2013 | Lee | |
| 8,644,596 B1 | 2/2014 | Wu et al. | |
| 8,681,224 B2 | 3/2014 | Mallon et al. | |
| 8,750,509 B2 | 6/2014 | Renkis | |
| 8,848,066 B2 | 9/2014 | Porter et al. | |
| 8,867,827 B2 | 10/2014 | Yeatman et al. | |
| 9,001,226 B1 | 4/2015 | Ng et al. | |
| 9,262,831 B2 | 2/2016 | Munzenmayer et al. | |
| 9,264,598 B1 | 2/2016 | Baldwin | |
| 9,282,367 B2 | 3/2016 | Daub | |
| 9,396,588 B1 | 7/2016 | Li | |
| 9,589,350 B1 | 3/2017 | Kozko | |
| 9,742,991 B2 | 8/2017 | Latorre | |
| 9,774,887 B1* | 9/2017 | Walkingshaw ...... | H04N 19/119 |
| 9,911,454 B2 | 3/2018 | Van Hoff et al. | |
| 10,210,898 B2 | 2/2019 | Van Hoff et al. | |
| 10,313,665 B2* | 6/2019 | Walkingshaw ...... | H04N 19/162 |
| 10,440,398 B2* | 10/2019 | Walkingshaw ...... | H04N 19/597 |
| 2001/0015751 A1 | 8/2001 | Geng | |
| 2002/0075295 A1 | 6/2002 | Stentz et al. | |
| 2002/0171741 A1 | 11/2002 | Tonkin et al. | |
| 2003/0025805 A1 | 2/2003 | Yamagishi | |
| 2003/0117488 A1 | 6/2003 | Pierce et al. | |
| 2004/0008256 A1 | 1/2004 | Kim | |
| 2004/0027451 A1 | 2/2004 | Baker | |
| 2004/0066449 A1 | 4/2004 | Givon | |
| 2004/0196378 A1 | 10/2004 | Kannermark et al. | |
| 2004/0246333 A1 | 12/2004 | Steuart | |
| 2005/0062869 A1 | 3/2005 | Zimmermann et al. | |
| 2005/0069167 A1 | 3/2005 | Zarrabizadeh | |
| 2006/0082663 A1 | 4/2006 | Rooy et al. | |
| 2007/0027844 A1 | 2/2007 | Toub et al. | |
| 2007/0035627 A1 | 2/2007 | Cleary et al. | |
| 2007/0097206 A1 | 5/2007 | Houvener et al. | |
| 2007/0146530 A1 | 6/2007 | Nose | |
| 2007/0159527 A1 | 7/2007 | Kim et al. | |
| 2007/0263076 A1 | 11/2007 | Andrews et al. | |
| 2008/0091526 A1 | 4/2008 | Shoemaker | |
| 2008/0143842 A1 | 6/2008 | Gillard et al. | |
| 2008/0262910 A1 | 10/2008 | Altberg et al. | |
| 2008/0263458 A1 | 10/2008 | Altberg et al. | |
| 2009/0076894 A1 | 3/2009 | Bates et al. | |
| 2009/0238378 A1 | 9/2009 | Kikinis et al. | |
| 2009/0249244 A1 | 10/2009 | Robinson et al. | |
| 2009/0288002 A1 | 11/2009 | Hamilton et al. | |
| 2010/0036735 A1 | 2/2010 | Hamilton et al. | |
| 2010/0045773 A1 | 2/2010 | Ritchey | |
| 2010/0083139 A1 | 4/2010 | Dawson et al. | |
| 2010/0097444 A1 | 4/2010 | Lablans | |
| 2010/0100429 A1 | 4/2010 | McCloskey et al. | |
| 2010/0119105 A1 | 5/2010 | Moriya et al. | |
| 2010/0141733 A1 | 6/2010 | Borchers et al. | |
| 2010/0164956 A1 | 7/2010 | Hyndman et al. | |
| 2010/0169842 A1 | 7/2010 | Migos | |
| 2010/0315479 A1 | 12/2010 | Wijngaarden et al. | |
| 2010/0318467 A1 | 12/2010 | Porter et al. | |
| 2010/0332980 A1 | 12/2010 | Sun et al. | |
| 2011/0058749 A1 | 3/2011 | Cooper | |
| 2011/0142132 A1 | 6/2011 | Tourapis et al. | |
| 2011/0157305 A1 | 6/2011 | Kosakai et al. | |
| 2011/0193956 A1 | 8/2011 | Gilg et al. | |
| 2011/0267510 A1 | 11/2011 | Malone et al. | |
| 2012/0050474 A1 | 3/2012 | Segall | |
| 2012/0056977 A1 | 3/2012 | Ohnishi | |
| 2012/0069236 A1 | 3/2012 | Namba et al. | |
| 2012/0105632 A1 | 5/2012 | Renkis | |
| 2012/0113278 A1 | 5/2012 | Okada | |
| 2012/0155786 A1 | 6/2012 | Zargarpour et al. | |
| 2012/0162362 A1 | 6/2012 | Garden et al. | |
| 2012/0169842 A1 | 7/2012 | Chuang et al. | |
| 2012/0194712 A1 | 8/2012 | Crook et al. | |
| 2012/0203640 A1 | 8/2012 | Karmarkar et al. | |
| 2012/0218296 A1 | 8/2012 | Belimpasakis et al. | |
| 2012/0218376 A1 | 8/2012 | Athan | |
| 2012/0232998 A1 | 9/2012 | Schoen | |
| 2012/0240077 A1 | 9/2012 | Vaittinen et al. | |
| 2012/0242788 A1 | 9/2012 | Chuang et al. | |
| 2012/0242794 A1 | 9/2012 | Park et al. | |
| 2012/0257095 A1 | 10/2012 | Velazquez | |
| 2012/0290401 A1 | 11/2012 | Neven | |
| 2012/0310717 A1 | 12/2012 | Kankainen | |
| 2012/0324493 A1 | 12/2012 | Holmdahl et al. | |
| 2012/0324494 A1 | 12/2012 | Burger et al. | |
| 2013/0016186 A1 | 1/2013 | Atanassov et al. | |
| 2013/0031475 A1 | 1/2013 | Maor et al. | |
| 2013/0035110 A1 | 2/2013 | Sridhara et al. | |
| 2013/0044187 A1 | 2/2013 | Hammes et al. | |
| 2013/0054576 A1 | 2/2013 | Karmarkar et al. | |
| 2013/0080974 A1 | 3/2013 | Suzuki | |
| 2013/0083159 A1 | 4/2013 | Ooshima | |
| 2013/0103624 A1 | 4/2013 | Thieberger | |
| 2013/0117375 A1 | 5/2013 | Bist et al. | |
| 2013/0124471 A1 | 5/2013 | Chen et al. | |
| 2013/0188010 A1 | 7/2013 | Dortch et al. | |
| 2013/0212606 A1 | 8/2013 | Kannan et al. | |
| 2013/0223537 A1 | 8/2013 | Kasai et al. | |
| 2013/0235347 A1 | 9/2013 | Hennessey et al. | |
| 2013/0250047 A1 | 9/2013 | Hollinger | |
| 2013/0258044 A1 | 10/2013 | Betts-Lacroix | |
| 2013/0259447 A1 | 10/2013 | Sathish et al. | |
| 2013/0266211 A1 | 10/2013 | Tippetts et al. | |
| 2013/0278631 A1 | 10/2013 | Border et al. | |
| 2013/0278635 A1 | 10/2013 | Maggiore | |
| 2014/0005484 A1 | 1/2014 | Charles | |
| 2014/0067828 A1 | 3/2014 | Archibong et al. | |
| 2014/0071234 A1 | 3/2014 | Millett | |
| 2014/0086446 A1 | 3/2014 | Han et al. | |
| 2014/0089097 A1 | 3/2014 | Byun et al. | |
| 2014/0097251 A1 | 4/2014 | Joussen et al. | |
| 2014/0099022 A1 | 4/2014 | McNamer | |
| 2014/0099623 A1 | 4/2014 | Amit et al. | |
| 2014/0104378 A1 | 4/2014 | Kauff et al. | |

(56) References Cited

U.S. PATENT DOCUMENTS

| | | |
|---|---|---|
| 2014/0125774 A1 | 5/2014 | Lee et al. |
| 2014/0126066 A1 | 5/2014 | Clavin et al. |
| 2014/0132788 A1 | 5/2014 | Ramsay et al. |
| 2014/0146132 A1 | 5/2014 | Bagnato et al. |
| 2014/0153916 A1 | 6/2014 | Kintner |
| 2014/0176749 A1 | 6/2014 | Horowitz |
| 2014/0184550 A1 | 7/2014 | Hennessey et al. |
| 2014/0201126 A1 | 7/2014 | Zadeh et al. |
| 2014/0232822 A1 | 8/2014 | Venkataraman et al. |
| 2014/0237495 A1 | 8/2014 | Jang et al. |
| 2014/0245335 A1 | 8/2014 | Holden et al. |
| 2014/0247352 A1 | 9/2014 | Rathi et al. |
| 2014/0267596 A1 | 9/2014 | Geerds |
| 2014/0270684 A1 | 9/2014 | Jayaram et al. |
| 2014/0280549 A1 | 9/2014 | Rajan et al. |
| 2014/0285486 A1 | 9/2014 | Chang et al. |
| 2014/0300532 A1 | 10/2014 | Karkkainen et al. |
| 2014/0309495 A1 | 10/2014 | Kirma et al. |
| 2014/0310630 A1 | 10/2014 | Asikainen et al. |
| 2014/0320608 A1 | 10/2014 | Muukki |
| 2014/0341484 A1 | 11/2014 | Sebring |
| 2014/0359647 A1 | 12/2014 | Shoemake et al. |
| 2014/0359656 A1 | 12/2014 | Banica et al. |
| 2014/0368609 A1 | 12/2014 | Chang et al. |
| 2015/0012827 A1 | 1/2015 | Elmeih et al. |
| 2015/0026718 A1 | 1/2015 | Seyller |
| 2015/0042953 A1 | 2/2015 | Teller |
| 2015/0050006 A1 | 2/2015 | Sipe |
| 2015/0058630 A1 | 2/2015 | Bae et al. |
| 2015/0067708 A1 | 3/2015 | Jensen et al. |
| 2015/0124088 A1 | 5/2015 | Vera et al. |
| 2015/0130705 A1 | 5/2015 | Im |
| 2015/0138065 A1 | 5/2015 | Alfieri |
| 2015/0169076 A1 | 6/2015 | Cohen et al. |
| 2015/0199006 A1 | 7/2015 | He et al. |
| 2015/0206329 A1 | 7/2015 | Devries |
| 2015/0208131 A1 | 7/2015 | Chatter et al. |
| 2015/0220768 A1* | 8/2015 | Ronnecke ............ G06K 9/0061 348/78 |
| 2015/0235434 A1 | 8/2015 | Miller et al. |
| 2015/0248918 A1 | 9/2015 | Tang |
| 2015/0260526 A1 | 9/2015 | Paduano et al. |
| 2015/0264092 A1 | 9/2015 | Herger et al. |
| 2015/0271483 A1 | 9/2015 | Sun et al. |
| 2015/0309310 A1 | 10/2015 | Cho et al. |
| 2015/0316982 A1 | 11/2015 | Miller |
| 2015/0317353 A1 | 11/2015 | Zavesky |
| 2015/0350561 A1 | 12/2015 | Vartanian |
| 2015/0356371 A1 | 12/2015 | Libal et al. |
| 2015/0373266 A1 | 12/2015 | Hsieh et al. |
| 2015/0379697 A1 | 12/2015 | Pohl |
| 2016/0011658 A1* | 1/2016 | Lopez .................. G06F 1/1632 345/156 |
| 2016/0026253 A1 | 1/2016 | Bradski et al. |
| 2016/0027216 A1* | 1/2016 | da Veiga ............... G06F 3/0484 345/419 |
| 2016/0037026 A1 | 2/2016 | Kintner |
| 2016/0037030 A1 | 2/2016 | Weissig et al. |
| 2016/0050370 A1 | 2/2016 | Campbell |
| 2016/0077710 A1 | 3/2016 | Lewis et al. |
| 2016/0156842 A1 | 6/2016 | Baldwin |
| 2016/0279516 A1 | 9/2016 | Gupta et al. |
| 2016/0286137 A1 | 9/2016 | Marks et al. |
| 2016/0295194 A1 | 10/2016 | Wang et al. |
| 2016/0306431 A1 | 10/2016 | Stafford et al. |
| 2017/0278306 A1 | 9/2017 | Rico |
| 2017/0280056 A1 | 9/2017 | Chapdelaine-Couture et al. |
| 2017/0329817 A1 | 11/2017 | Stoica-Beck et al. |
| 2018/0096507 A1 | 4/2018 | Valdivia et al. |
| 2018/0192094 A1 | 7/2018 | Barnett et al. |
| 2018/0357810 A1 | 12/2018 | Young et al. |
| 2019/0052869 A1 | 2/2019 | Lutter et al. |
| 2019/0052870 A1 | 2/2019 | Lutter et al. |
| 2019/0265945 A1 | 8/2019 | Newell et al. |

* cited by examiner

500

```
┌─────────────────────────────────────────┐
│ Receive head-tracking data that describe │
│ one or more positions of people while    │
│ the people are viewing a 3D video on     │
│ viewing devices 502                      │
└─────────────────────────────────────────┘
                    ↓
┌─────────────────────────────────────────┐
│ Generate a probabilistic model of the one│
│ or more positions of the people based on │
│ the head-tracking data, where the        │
│ probabilistic model identifies a         │
│ probability of a viewer looking in a     │
│ particular direction as a function of    │
│ time 504                                 │
└─────────────────────────────────────────┘
                    ↓
┌─────────────────────────────────────────┐
│ Generate video segments from the 3D video│
│ 506                                      │
└─────────────────────────────────────────┘
                    ↓
┌─────────────────────────────────────────┐
│ For each of the video segments:          │
│ • Determine a directional encoding format│
│   that projects latitudes and longitudes │
│   of locations of a surface of a sphere  │
│   onto locations on a plane              │
│ • Determine a cost function that         │
│   identifies a region of interest on the │
│   plane based on the probabilistic model │
│ • Generate optimal segment parameters    │
│   that minimize a sum-over position for  │
│   the region of interest 508             │
└─────────────────────────────────────────┘
                    ↓
┌─────────────────────────────────────────┐
│ Re-encode the 3D video to include the    │
│ optimal segment parameters for each of   │
│ the video segments and to blur portions  │
│ of each of the video segments based on   │
│ the probability, where an intensity of a │
│ level of blur increases as the           │
│ probability of the viewer looking in the │
│ particular direction decreases 510       │
└─────────────────────────────────────────┘
```

Fig. 5

PROBABILISTIC MODEL TO COMPRESS IMAGES FOR THREE-DIMENSIONAL VIDEO

CROSS REFERENCE TO RELATED APPLICATIONS

This application is a continuation of U.S. patent application Ser. No. 15/617,878, entitled "Probabilistic Model to Compress Images for Three-Dimensional Video," filed Jun. 8, 2017, which is a continuation-in-part of U.S. patent application Ser. No. 15/269,734, entitled "Behavioral Directional Encoding of Three-Dimensional Video," filed Sep. 19, 2016 (now U.S. Pat. No. 9,774,887). This application is a continuation-in-part of U.S. patent application Ser. No. 14/842,465, entitled "Virtual Reality System Including Social Graph," filed Sep. 21, 2015, which claims priority under 35 USC § 119(e) to U.S. Provisional Application No. 62/142,909, entitled "Image Stitching," filed Apr. 3, 2015 and U.S. Provisional Application No. 62/055,259, entitled "Virtual Reality System Including Social Graph," filed Sep. 25, 2014, is a continuation-in-part of U.S. patent application Ser. No. 14/726,118, entitled "Camera Array Including Camera Modules," filed May 29, 2015 (now U.S. Pat. No. 9,911,454), and is a continuation-in-part of U.S. application Ser. No. 14/444,938, entitled "Camera Array Including Camera Modules," filed Jul. 28, 2014 (now U.S. Pat. No. 9,451,162), each of which is incorporated by reference.

FIELD

The embodiments discussed herein are related to behavioral directional encoding of three-dimensional video. More particularly, the embodiments discussed herein relate to using a probabilistic model, such as a heat map, to determine optimal segment parameters and portions of a three-dimensional video to blur.

BACKGROUND

Generating virtual reality content for a 360° environment may be analogized to generating content that is displayed in a sphere that surrounds a user. Because the user may look anywhere in the sphere, current virtual reality systems generate high-quality content for every pixel in the sphere. As a result, virtual reality content is data rich. Because the user may only look in one direction, most of the pixels in the view are not seen by the user. For example, it is frequently a waste of bandwidth to include data rich content that is located behind the user because the user is unlikely to turn 180 degrees to view that content.

When the virtual reality content is for a video, the data requirements are massive because the video is generated for each pixel in the sphere. As a result, it may be difficult to stream the virtual reality content to the user because of bandwidth constraints.

One solution to the problem of current virtual reality systems may be to provide a viewing device with virtual reality content that corresponds to the direction of the user's gaze. However, because the user may move and look in a different direction, the movement may result in the user perceiving a lag in the virtual reality content as the virtual reality system updates the direction and transmits virtual reality content for the different direction.

Another solution may be to predict the direction of the user's gaze. However, if the prediction is wrong, the resulting virtual reality content may have both lower quality and less stability than traditional virtual reality content.

SUMMARY

According to one innovative aspect of the subject matter described in this disclosure, a method includes receiving head-tracking data that describe one or more positions of people while the people are viewing a three-dimensional video, generating a probabilistic model of the one or more positions of the people based on the head-tracking data, wherein the probabilistic model identifies a probability of a viewer looking in a particular direction as a function of time, generating video segments from the three-dimensional video, and for each of the video segments: determining a directional encoding format that projects latitudes and longitudes of locations of a surface of a sphere onto locations on a plane, determining a cost function that identifies a region of interest on the plane based on the probabilistic model, and generating optimal segment parameters that minimize a sum-over position for the region of interest.

In some embodiments, the probabilistic model is a heat map. In some embodiments, the method may also include re-encoding the three-dimensional video to include the optimal segment parameters for each of the video segments and to blur portions of each of the video segments based on the probability, wherein an intensity of a level of blur increases as the probability of the viewer looking in the particular direction decreases and providing a re-encoded video and the optimal segment parameters for each of the video segments to a viewing device, wherein the viewing device uses the optimal segment parameters for each of the video segments to un-distort the re-encoded video and texture the re-encoded video to the sphere to display the re-encoded video with the region of interest for each of the video segments displayed at a higher resolution than other regions in each of the video segments. In some embodiments, the three-dimensional video may be re-encoded to include the optimal segment parameters for each of the video segments and blurring portions of each of the video segments occurs responsive to a threshold number of the people viewing the three-dimensional video. In some embodiments, the method includes for each of the video segments, identifying a region of low interest, re-encoding the three-dimensional video to include the optimal segment parameters for each of the video segments and blurring of the region of low interest, and providing a re-encoded video and the optimal segment parameters for each of the video segments to a viewing device, wherein the viewing device uses the optimal segment parameters for each of the video segments to un-distort the re-encoded video and texture the re-encoded video to the sphere to display the re-encoded video with the region of interest for each of the video segments displayed at a higher resolution than other regions in each of the video segments and the region of low interest displayed at a lower resolution than other regions in each of the video segments. In some embodiments, the method includes re-encoding the three-dimensional video to include the optimal segment parameters for each of the video segments and blurring portions of each of the video segments based on the probability, wherein an intensity of a level of blur increases as the probability of the viewer looking in the particular direction decreases and providing a re-encoded video and the optimal segment parameters for each of the video segments to a client device, wherein the client device uses the re-encoded video and the optimal segment parameters for each of the video segments to generate a two-dimensional video that automates head movement. The method may further include providing a user with an option to modify the two-dimensional video by at least one of selecting different optimal segment parameters and selecting a different region of interest for one or more of the video segments. In some embodiments, the method further includes cropping the region of interest for one or more video segments based on the optimal segment parameters to form one or more thumbnails of one or more cropped regions of interest and generating a timeline of the three-dimensional video with the one or more thumbnails. In some embodiments, generating the video segments from the three-dimensional video includes generating equal-length video segments of a predetermined length.

In some embodiments, a system comprises one or more processors coupled to a memory, a head tracking module stored in the memory and executable by the one or more processors, the head tracking module operable to receive head-tracking data that describe one or more positions of people while the people are viewing a set of three-dimensional videos, generate a set of probabilistic models of the one or more positions of the people based on the head-tracking data, and estimate a first probabilistic model for a first three-dimensional video, wherein the first probabilistic model identifies a probability of a viewer looking in a particular direction as a function of time and the first three-dimensional video is not part of the set of three-dimensional videos, a segmentation module stored in the memory and executable by the one or more processors, the segmentation module operable to generate video segments from the three-dimensional video, and a parameterization module stored in the memory and executable by the one or more processors, the parameterization module operable to, for each of the video segments: determine a directional encoding format that projects latitudes and longitudes of locations of a surface of a sphere onto locations on a plane, determine a cost function that identifies a region of interest on the plane based on the first probabilistic model, and generate optimal segment parameters that minimize a sum-over position for the region of interest.

Other aspects include corresponding methods, systems, apparatus, and computer program products for these and other innovative aspects.

The disclosure is particularly advantageous in a number of respects. First, the virtual reality application generates a probabilistic model, such as a heat map, that describes a probability of a viewer looking in a particular direction as a function of time. The virtual reality application may re-encode a three-dimensional video based on the probabilistic model to blur portions of the three-dimensional video and to optimize regions of interest in the three-dimensional video based on the probability. As a result, the re-encoded three-dimensional video may be transmitted to a client device with a lower bitrate and may be perceived by a viewer as having higher visual quality than other examples of three-dimensional video. In addition, less bandwidth is spent by the client device to un-distort and re-encode the three-dimensional video with blurred portions.

The client device includes a codec that is advantageously compatible with the methods described in this application. As a result, no additional software is needed for the client device to render the three-dimensional video. In addition, because the blurring occurs locally and reduces the entropy of that region of the three-dimensional video, it makes the three-dimensional video more compressive. As a result, the codec on the client device spends less bandwidth on the blurred portions relative to the rest of the three-dimensional video and more bandwidth on the regions of interest in the three-dimensional video.

In some embodiments, the virtual reality application generates probabilistic models for a set of three-dimensional videos and uses artificial intelligence, such as a neural network, to estimate a probabilistic model for a particular three-dimensional video. This advantageously avoids the need to find people to view every three-dimensional video in order to generate head-tracking data.

BRIEF DESCRIPTION OF THE DRAWINGS

FIG. 5 illustrates an example flow diagram for re-encoding a three-dimensional video with blurred portions.

DESCRIPTION OF EMBODIMENTS

The disclosure relates to generating virtual reality content. A virtual reality application receives head-tracking data that describe positions of people's heads while the people are viewing a three-dimensional video. For example, the head-tracking data measures the yaw, pitch, and roll associated with people that are using a viewing device to view the three-dimensional video.

The virtual reality application generates probabilistic model of the one or more positions of the people based on the head-tracking data. The probabilistic model identifies a probability of a viewer looking in a particular direction as a function of time. For example, if most people that view the video look straight ahead at a particular object, the direction that is directly behind most people is unlikely to be a direction that people look in.

The virtual reality application generates video segments from the three-dimensional video. For example, the video segments may be a fixed length of time, such as two seconds (or three, four, etc.) or the video segments may be based on scene boundaries in the three-dimensional video.

For each of the video segments, the virtual reality application determines a directional encoding format that projects latitudes and longitudes of locations of a surface of sphere onto locations on a plane. For example, the virtual reality application may use a map projection to take three-dimensional video content that is designed for a sphere and map it onto a plane. For each of the video segments, the virtual reality application determines a cost function that identifies a region of interest on the plane based on the probabilistic model. For example, the virtual reality application may determine that most people look in a particular direction during the video segment. For each of the video segments, the virtual reality application generates optimal segment parameters that minimize a sum-over position for the region of interest. For example, the virtual reality application generates yaw, pitch, and roll values for the segment to identify the region of interest.

The optimal segment parameters may be used in a variety of applications. For example, the virtual reality application may re-encode the three-dimensional video to include the optimal segment parameters for each of the video segments, blur portions of each of the video segments based on the probability, and provide the re-encoded video and the optimal segment parameters to a viewing device. The viewing device may use the optimal segment parameters to un-distort the re-encoded video and texture the re-encoded video to the sphere. As a result, a user using the viewing the three-dimensional video may view the regions of interest at a higher resolution than the other regions in the three-dimensional video and the blurred portions of the three-dimensional video at a lower resolution than other regions in the three-dimensional video.

Example System

Figure 1:
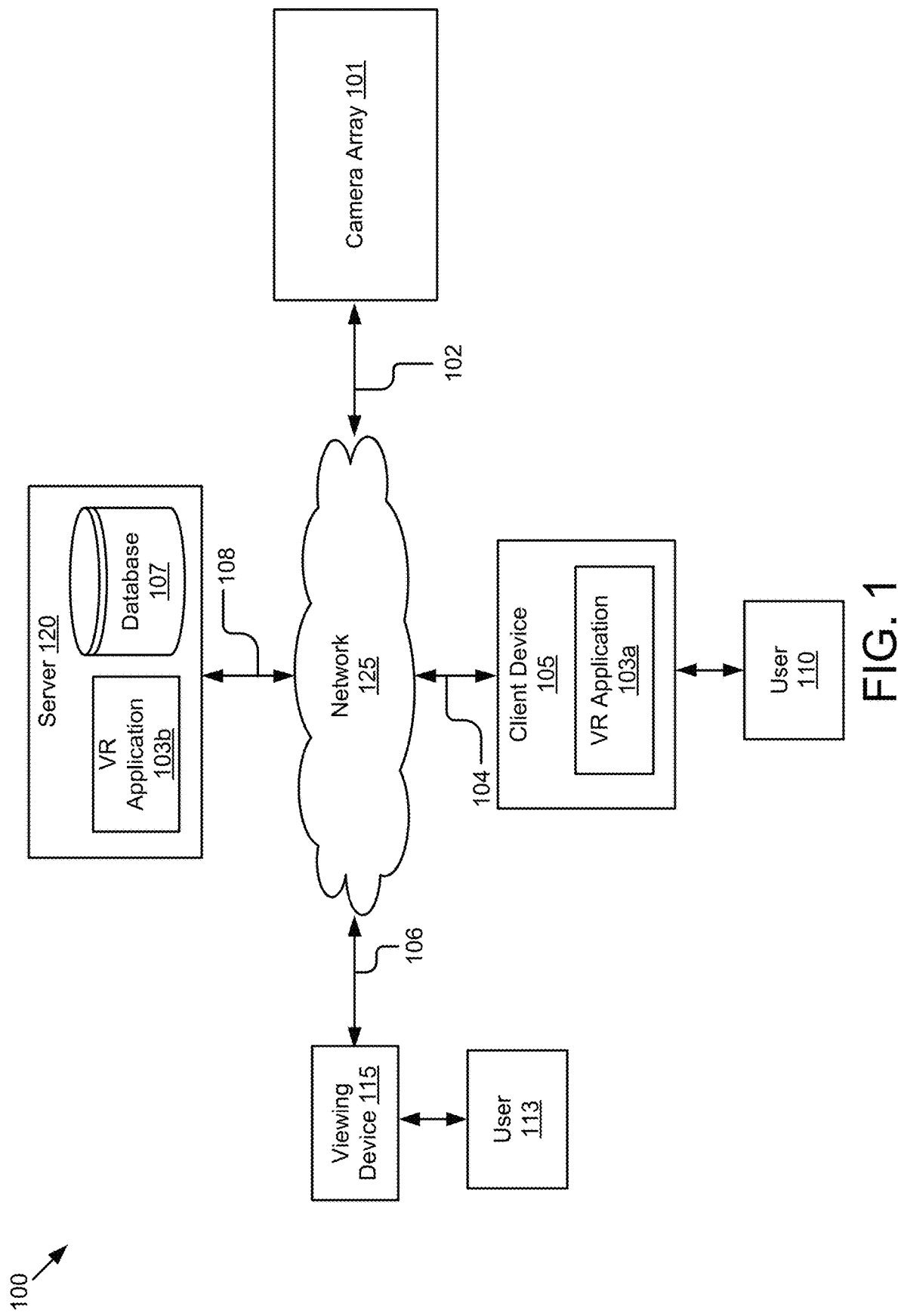
FIG. 1 illustrates an example virtual reality system that generates optimal segment parameters for a three-dimensional video according to some embodiments.

FIG. 1 illustrates an example virtual reality system 100 that determines optimal segment parameters for virtual reality content. The virtual reality system 100 comprises a camera array 101, a client device 105, a viewing device 115, a server 120, and a network 125.

While FIG. 1 illustrates one camera array 101, one client device 105, one viewing device 115, and one server 120, the disclosure applies to a system architecture having one or more camera arrays 101, one or more client devices 105, one or more viewing devices 115, and one or more servers 120. Furthermore, although FIG. 1 illustrates one network 125 coupled to the entities of the system 100, in practice one or more networks 125 may be connected to these entities and the one or more networks 125 may be of various and different types.

The camera array 101 may comprise camera modules that capture video data. The camera array 101 may communicate with the client device 105 and/or the server 120 by accessing the network 125 via signal line 102. Signal line 102 may represent a wireless or a wired connection. For example, the camera array 101 may wirelessly transmit video data over the network 125 to the server 120. In some embodiments, the camera array 101 may be directly connected to the client device 105. For example, the camera array 101 may be connected to the client device 105 via a universal serial bus (USB) cable.

The network 125 may be a conventional type, wired or wireless, and may have numerous different configurations including a star configuration, token ring configuration, or other configurations. Furthermore, the network 125 may include a local area network (LAN), a wide area network (WAN) (e.g., the Internet), or other interconnected data paths across which multiple devices may communicate. In some embodiments, the network 125 may be a peer-to-peer network. The network 125 may also be coupled to or include portions of a telecommunications network for sending data in a variety of different communication protocols. In some embodiments, the network 125 may include Bluetooth™ communication networks or a cellular communication network for sending and receiving data including via short messaging service (SMS), multimedia messaging service (MMS), hypertext transfer protocol (HTTP), direct data connection, wireless access protocol (WAP), e-mail, etc.

The client device 105 may be a processor-based computing device. For example, the client device 105 may be a personal computer, laptop, tablet computing device, smart-phone, set top box, network-enabled television, or any other processor based computing device. In some embodiments, the client device 105 includes network functionality and is communicatively coupled to the network 125 via a signal line 104. The client device 105 may be configured to transmit data to the server 120 or to receive data from the server 120 via the network 125. A user 110 may access the client device 105.

The client device 105 may include a virtual reality (VR) application 103a. The virtual reality application 103a may be configured to control the camera array 101 and/or aggregate video data and audio data to generate a stream of three-dimensional video data. In some embodiments, the virtual reality application 103a can be implemented using hardware including a field-programmable gate array ("FPGA") or an application-specific integrated circuit ("ASIC"). In some other embodiments, the virtual reality application 103a may be implemented using a combination of hardware and software.

The server 120 may be a hardware server that includes a processor, a memory, a database 107, and network communication capabilities. In the illustrated embodiment, the server 120 is coupled to the network 125 via signal line 108. The server 120 sends and receives data to and from one or more of the other entities of the system 100 via the network 125. For example, the server 120 receives virtual reality content including a stream of three-dimensional video data (or compressed three-dimensional video data) from the camera array 101 and/or the client device 105 and stores the virtual reality content on a storage device (e.g., the database 107) associated with the server 120. The database 107 may store a set of three-dimensional videos that are used to generate head-tracking data. For example, the virtual reality application 103b may use the head-tracking data to estimate a probabilistic model for a three-dimensional video that is not part of the set of three-dimensional videos.

The server 120 may include a virtual reality application 103b that receives video data and audio data from the client device 105 and/or the camera array 101 and aggregates the video data to generate the virtual reality content. The virtual reality application 103b may generate the optimal segment parameters for the three-dimensional video.

The viewing device 115 may be operable to display virtual reality content. The viewing device 115 may include or use a computing device to decode and render a stream of three-dimensional video data on a virtual reality display device (e.g., Oculus Rift virtual reality display) or other suitable display devices that include, but are not limited to: augmented reality glasses; televisions, smartphones, tablets, or other devices with three-dimensional displays and/or position tracking sensors; and display devices with a viewing position control, etc. The viewing device 115 may also decode and render a stream of three-dimensional audio data on an audio reproduction device (e.g., a headphone or other suitable speaker devices). The viewing device 115 may include the virtual reality display configured to render the three-dimensional video data and the audio reproduction device configured to render the three-dimensional audio data.

The viewing device 115 may be coupled to the network 125 via signal line 106. The viewing device 115 may communicate with the client device 105 and/or the server 120 via the network 125 or via a direct connection with the client device 105 (not shown). A user 113 may interact with the viewing device 115. The user 113 may be the same or different from the user 110 that accesses the client device 105.

In some embodiments, the viewing device 115 receives virtual reality content from the client device 105. Alternatively or additionally, the viewing device 115 receives the virtual reality content from the server 120. The virtual reality content may include one or more of a stream of three-dimensional video data, a stream of three-dimensional audio data, a compressed stream of three-dimensional video data, a compressed stream of three-dimensional audio data, and other suitable content. In some embodiments, the viewing device 115 and the client device 105 may be the same device.

The viewing device 115 may track a head orientation of a user 113 while the user 113 is viewing three-dimensional video. For example, the viewing device 115 may include one or more accelerometers or gyroscopes used to detect a change in the user's 113 head orientation. The viewing device 115 may decode and render the stream of three-dimensional video data on a virtual reality display device based on the head orientation of the user 113. As the user 113 changes his or her head orientation, the viewing device 115 may adjust the rendering of the three-dimensional video data and three-dimensional audio data based on the changes of the user's 113 head orientation. The viewing device 115 may log head-tracking data and transmit the head-tracking data to the virtual reality application 103. Although not illustrated, in some embodiments the viewing device 115 may include some or all of the components of the virtual reality application 103 described below.

The virtual reality application 103 may receive the head-tracking data corresponding to the three-dimensional video from the viewing device 115. The virtual reality application 103 may generate video segments from the three-dimensional video and determine optimal segment parameters for each of the video segments based on the head-tracking data. For example, the virtual reality application 103 may receive head-tracking data for multiple users 113 and determine from the head-tracking data that most users 113 have particular head orientations during the viewing. The particular head orientations could include looking upwards as a bird is displayed as flying overhead, moving from left to right as a car is displayed as driving past the user 113, etc. The virtual reality application 103 may transmit the optimal segment parameters to the viewing device 115, which may use the optimal segment parameters to re-encode the three-dimensional video. For example, the viewing device 115 may re-encode the three-dimensional video to include regions of interest (i.e., one or more areas where users 113 were more likely to look) with a higher resolution than other regions of the three-dimensional video.

Example Computing Device

Figure 2:
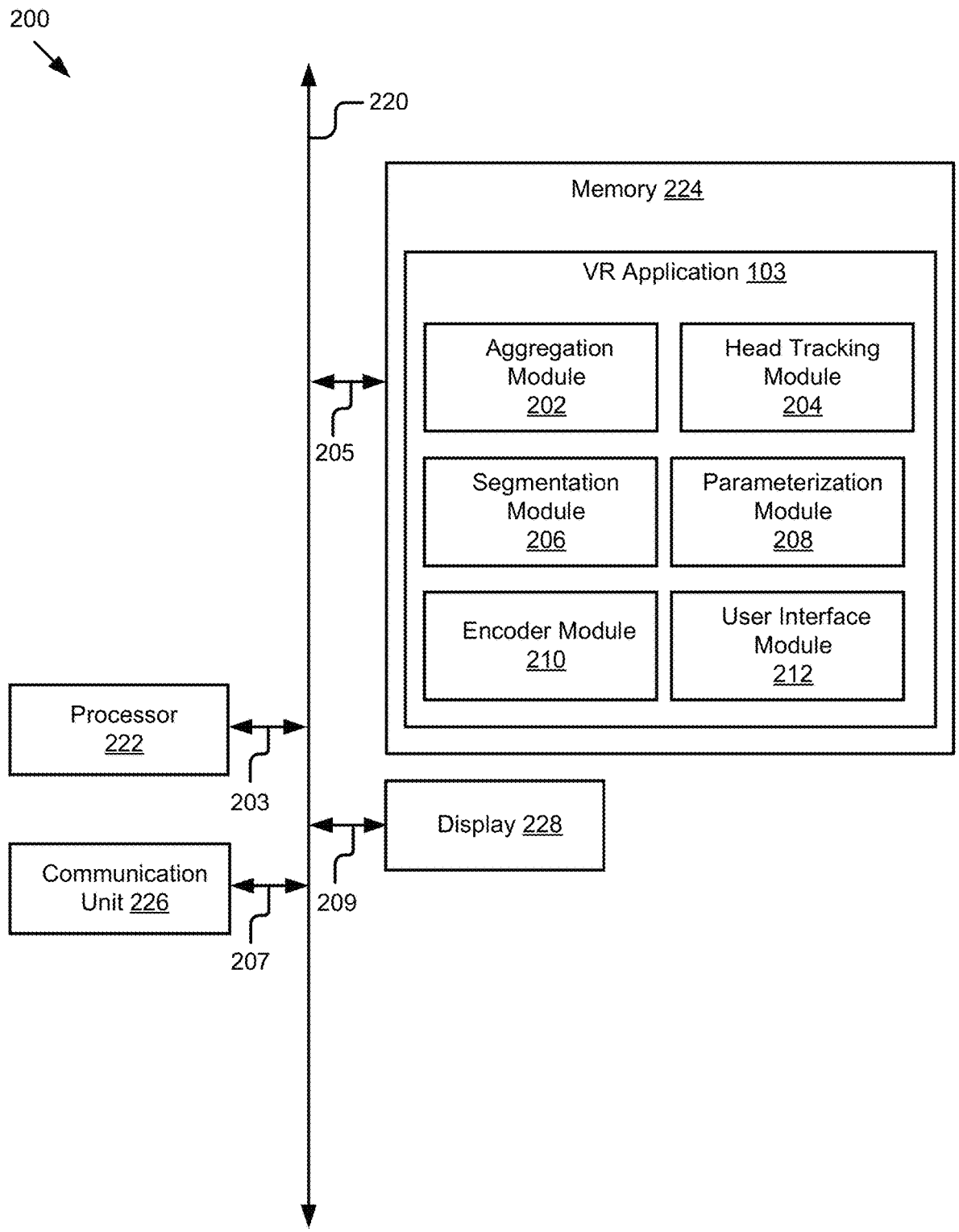
FIG. 2 illustrates an example computing device that generates optimal segment parameters for a three-dimensional video according to some embodiments.

FIG. 2 illustrates an example computing device 200 that generates three-dimensional video according to some embodiments. The computing device 200 may be the server 120 or the client device 105. In some embodiments, the computing device 200 may include a special-purpose computing device configured to provide some or all of the functionality described below with reference to FIG. 2.

FIG. 2 may include a processor 222, a memory 224, a communication unit 226, and a display 228. The processor 222, the memory 224, the communication unit 226, and the display 228 are communicatively coupled to the bus 220. Other hardware components may be part of the computing device 200, such as sensors (e.g., a gyroscope, accelerometer), etc.

The processor 222 may include an arithmetic logic unit, a microprocessor, a general-purpose controller, or some other processor array to perform computations and provide electronic display signals to a display device. The processor 222 processes data signals and may include various computing architectures including a complex instruction set computer (CISC) architecture, a reduced instruction set computer (RISC) architecture, or an architecture implementing a combination of instruction sets. Although FIG. 2 includes a single processor 222, multiple processors may be included. Other processors, operating systems, sensors, displays, and physical configurations may be possible. The processor 222 is coupled to the bus 220 for communication with the other components via signal line 203.

The memory 224 stores instructions or data that may be executed by the processor 222. The instructions or data may include code for performing the techniques described herein. For example, the memory 224 may store the virtual reality application 103, which may be a series of modules that include instructions or data for generating three-dimensional videos.

The memory 224 may include a dynamic random access memory (DRAM) device, a static random access memory (SRAM) device, flash memory, or some other memory device. In some embodiments, the memory 224 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. The memory 224 is coupled to the bus 220 for communication with the other components via signal line 205.

The communication unit 226 may include hardware that transmits and receives data to and from the camera array 101, the viewing device 115, and the client device 105 or the server 120, depending on whether the virtual reality application 103 is stored on the server 120 or the client device 105, respectively. The communication unit 226 is coupled to the bus 220 via signal line 207. In some embodiments, the communication unit 226 includes one or more ports for direct physical connection to the network 125 or another communication channel. For example, the communication unit 226 includes a USB, SD, CAT-5, or similar port for wired communication with the computing device 200. In some embodiments, the communication unit 226 includes a wireless transceiver for exchanging data with the computing device 200 or other communication channels using one or more wireless communication methods, including IEEE 802.11, IEEE 802.16, Bluetooth®, or another suitable wireless communication method.

In some embodiments, the communication unit 226 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 226 includes a wired port and a wireless transceiver. The communication unit 226 also provides other conventional connections to the network 125 for distribution of files or media objects using standard network protocols including TCP/IP, HTTP, HTTPS, and SMTP, etc.

The display 228 may include hardware for displaying graphical data from the virtual reality application 103. For example, the display 228 renders graphics for displaying a user interface where a user may view a two-dimensional video that was generated from a three-dimensional video. The display 228 is coupled to the bus 220 via signal line 209. The display 228 is optional hardware that may not be included in the computing device 200, for example, if the computing device 200 is a server.

The virtual reality application 103 may include an aggregation module 202, a head tracking module 204, a segmentation module 206, a parameterization module 208, an encoder module 210, and a user interface module 212. Although the modules are illustrated as being part of the same computing device 200, in some embodiments some of the modules are stored on the server 120 and some of the modules are stored on the client device 105. For example, the server 120 may include the head tracking module 204, the segmentation module 206, the parameterization module, and the encoder module 210 and the client device 105 may include the user interface module 212.

The aggregation module 202 may include code and routines for aggregating video data. In some embodiments, the aggregation module 202 includes a set of instructions executable by the processor 222 to aggregate video data. In some embodiments, the aggregation module 202 is stored in the memory 224 of the computing device 200 and is accessible and executable by the processor 222. In some embodiments, the aggregation module 202 may be part of a separate application.

The aggregation module 202 may receive video data from the camera array 101. In some embodiments, the video data includes separate video recordings for each camera module included in the camera array 101 and a device identifier (ID) that identifies the camera module corresponding to each separate video recording.

A two-dimensional (2D) spherical panoramic image may be used to represent a panorama of an entire scene. The aggregation module 202 may generate two stereoscopic panorama images for two eyes to provide a stereoscopic view of the entire scene. For example, a left panoramic image may be generated for the left eye viewing and a right panoramic image may be generated for the right eye viewing.

A pixel in a panoramic image may be represented by a yaw value and a pitch value. Yaw represents rotation around the center and may be represented on the horizontal x-axis as: yaw=360°×x/width. Yaw has a value between 0° and 360°. Pitch represents up or down rotation and may be represented on the vertical y-axis as: pitch=90°×(height/2−y)/(height/2). Pitch has a value between −90° and 90°.

Typical stereoscopic systems (e.g., three-dimensional movies) may respectively show two different planar images to two eyes to create a sense of depth. In each planar image, all pixels in the image represent a single eye viewing position. For example, all pixels in the planar image may represent a view into the same viewing direction. However, in the panoramic image described herein (the left or right panoramic image), each pixel in the panoramic image may represent a view into a slightly different direction. For example, a pixel at an x position with pitch=0° in a left panoramic image may represent an eye viewing position of the left eye as the head is rotated by the yaw indicated by the x position. Similarly, a pixel at an x position with pitch=0° in a right panoramic image represents an eye viewing position of the right eye as the head is rotated by the yaw indicated by the x position. For pitch=0° (e.g., no up and down rotations), as the head is rotated from x=0 to x=width, a blended panorama for eye viewing positions with all 360-degree head rotations in the horizontal axis may be produced.

In some implementations, the blended panorama is effective for head rotations along the horizontal axis (e.g., yaw) but not for the vertical axis (e.g., pitch). For example, when a user looks upward, the quality of the stereo view may degrade. In order to correct this deficiency, the interocular distance may be adjusted based on the current pitch value. For example, if pitch≠0°, the interocular distance associated with the pitch may be adjusted as: interocular distance=max (interocular distance)×cos(pitch), where max(interocular distance) represents the maximum value of the interocular distance (e.g., the interocular distance is at its maximum when pitch=0°). In some examples, the maximum value of the interocular distance may be about 60 millimeters. In other examples, the maximum value of the interocular distance may have a value greater than 60 millimeters or less than 60 millimeters.

The aggregation module 202 may construct a left camera mapping map for each pixel in a left panoramic image. For example, for a pixel in a left panoramic image that represents a point in a panorama, the left camera mapping map may identify matching camera modules from a camera array with spherical modules that have each a better view for the point in the panorama than other camera modules. Thus, the left camera mapping map may map pixels in a left panoramic image to matching camera modules that have better views for the corresponding pixels.

For each pixel in a left panoramic image that represents a point in a panorama, the aggregation module 202 may determine a yaw, a pitch, and an interocular distance using the above mathematical expressions (1), (2), and (3), respectively. The aggregation module 202 may use the yaw and pitch to construct a vector representing a viewing direction of the left eye (e.g., a left viewing direction) to the corresponding point in the panorama.

Similarly, the aggregation module 202 may construct a right camera mapping map that identifies a corresponding matching camera module for each pixel in a right panoramic image. For example, for a pixel in a right panoramic image that represents a point in a panorama, the right camera mapping map may identify a matching camera module that has a better view for the point in the panorama than other camera modules. Thus, the right camera mapping map may map pixels in a right panoramic image to matching camera modules that have better views for the corresponding pixels.

For each pixel in a right panoramic image that represents a point in a panorama, the aggregation module 202 may determine a yaw, a pitch, and an interocular distance using the above mathematical expressions, respectively. The aggregation module 202 may use the yaw and pitch to construct a vector representing a viewing direction of the right eye (e.g., a right viewing direction) to the corresponding point in the panorama.

The aggregation module 202 may receive video recordings that describe image frames from the various camera modules in a camera array. The aggregation module 202 identifies a location and timing associated with each of the camera modules and synchronizes the image frames based on locations and timings of the camera modules. The aggregation module 202 synchronizes image frames captured by different camera modules at the same time frames.

For example, the aggregation module 202 receives a first video recording with first images from a first camera module and a second video recording with second images from a second camera module. The aggregation module 202 identifies that the first camera module is located at a position with yaw=0° and pitch=0° and the second camera module is located at a position with yaw=30° and pitch=0°. The aggregation module 202 synchronizes the first images with the second images by associating a first image frame from the first images at a time frame $T=T_0$ with a second image frame from the second images at the time frame $T=T_0$, a third image frame from the first images at a time frame $T=T_1$ with a fourth image frame from the second images at the time frame $T=T_1$, and so on and so forth.

The aggregation module 202 may construct a stream of left panoramic images from the image frames based on the left camera mapping map. For example, the aggregation module 202 identifies matching camera modules listed in the left camera mapping map. The aggregation module 202 constructs a first left panoramic image $PI_{L,0}$ for a first time frame $T=T_0$ by stitching together image frames captured at the first time frame $T=T_0$ by the matching camera modules. The aggregation module 202 constructs a second left panoramic image $PI_{L,1}$ at a second time frame $T=T_1$ using image frames captured at the second time frame $T=T_1$ by the matching camera modules, and so on and so forth. The aggregation module 202 constructs the stream of left panoramic images to include the first left panoramic image $PI_{L,0}$ at the first time frame $T=T_0$, the second left panoramic image $PI_{L,1}$ at the second time frame $T=T_1$, and other left panoramic images at other corresponding time frames.

Specifically, for a pixel in a left panoramic image $PI_{L,i}$ at a particular time frame $T=T_1$ ($i=0, 1, 2, \ldots$), the aggregation module 202: (1) identifies a matching camera module from the left camera mapping map; and (2) configures the pixel in the left panoramic image $PI_{L,i}$ to be a corresponding pixel from an image frame captured by the matching camera module at the same time frame $T=T_1$. The pixel in the left panoramic image $PI_{L,i}$ and the corresponding pixel in the image frame of the matching camera module may correspond to the same point in the panorama. For example, for a pixel location in the left panoramic image $PI_{L,i}$ that corresponds to a point in the panorama, the aggregation module 202: (1) retrieves a pixel that also corresponds to the same point in the panorama from the image frame captured by the matching camera module at the same time frame $T=T_1$; and (2) places the pixel from the image frame of the matching camera module into the pixel location of the left panoramic image $PI_{L,i}$.

Similarly, the aggregation module 202 constructs a stream of right panoramic images from the image frames based on the right camera mapping map by performing operations similar to those described above with reference to the construction of the stream of left panoramic images. For example, the aggregation module 202 identifies matching camera modules listed in the right camera mapping map. The aggregation module 202 constructs a first right panoramic image $PI_{R,0}$ for a first time frame $T=T_0$ by stitching together image frames captured at the first time frame $T=T_0$ by the matching camera modules. The aggregation module 202 constructs a second right panoramic image $PI_{R,1}$ at a second time frame $T=T_1$ using image frames captured at the second time frame $T=T_1$ by the matching camera modules, and so on and so forth. The aggregation module 202 constructs the stream of right panoramic images to include the first right panoramic image $PI_{R,0}$ at the first time frame $T=T_0$, the second right panoramic image $PI_{R,1}$ at the second time frame $T=T_1$, and other right panoramic images at other corresponding time frames.

Specifically, for a pixel in a right panoramic image $PI_{R,i}$ at a particular time frame $T=T_1$ ($i=0, 1, 2, \ldots$), the aggregation module 202: (1) identifies a matching camera module from the right camera mapping map; and (2) configures the pixel in the right panoramic image $PI_{R,i}$ to be a corresponding pixel from an image frame captured by the matching camera module at the same time frame $T=T_1$. The pixel in the right panoramic image $PI_{R,i}$ and the corresponding pixel in the image frame of the matching camera module may correspond to the same point in the panorama.

The aggregation module 202 may obtain virtual reality content from the stream of left panoramic images, the stream of right panoramic images, and the audio data by sending one or more of the stream of left panoramic images, the stream of right panoramic images, and the audio data to the encoder module 210 for encoding. The encoder module 210 may compress the stream of left panoramic images and the stream of right panoramic images to generate a stream of compressed three-dimensional video data using video compression techniques. In some implementations, within each stream of the left or right panoramic images, the encoder module 210 may use redundant information from one frame to a next frame to reduce the size of the corresponding stream. For example, with reference to a first image frame (e.g., a reference frame), redundant information in the next image frames may be removed to reduce the size of the next image frames. This compression may be referred to as temporal or inter-frame compression within the same stream of left or right panoramic images.

Alternatively or additionally, the encoder module 210 may use one stream (either the stream of left panoramic images or the stream of right panoramic images) as a reference stream and may compress the other stream based on the reference stream. This compression may be referred to as inter-stream compression. For example, the encoder module 210 may use each left panoramic image as a reference frame for a corresponding right panoramic image and may compress the corresponding right panoramic image based on the referenced left panoramic image. The encoding process is discussed in greater detail below with reference to the encoder module 210. Once the encoder module 210 completes the encoding process, the aggregation module 202 may transmit, via the communication unit 226, the three-dimensional video to the viewing device 115.

The head tracking module 204 may include code and routines for receiving head tracking data and generating a probabilistic model. In some embodiments, the head tracking module 204 includes a set of instructions executable by the processor 222 to receive head tracking data and generate the probabilistic model. In some embodiments, the head tracking module 204 is stored in the memory 224 of the computing device 200 and is accessible and executable by the processor 222.

The head tracking module 204 may receive head tracking data from the viewing device 115 that corresponds to a three-dimensional video. The head tracking data may describe a person's head movement as the person watches the three-dimensional video. For example, the head tracking data may reflect that a person moved her head up and to the right to look at an image of a squirrel in a tree. In some embodiments, the head tracking data includes yaw (i.e., rotation around a vertical axis), pitch (i.e., rotation around a side-to-side axis), and roll (i.e., rotation around a front-to-back axis) for a person as a function of time that corresponds to the three-dimensional video. In some implementations, the head tracking module 204 determines a head-mounted display position for each person at a particular frequency, such as 10 Hz throughout the three-dimensional video.

In some embodiments, the head tracking module 204 generates user profiles based on the head tracking data. For example, the head tracking module 204 may aggregate head tracking data from multiple people and organize it according to a first most common region of interest in the three-dimensional video, a second most common region of interest in the three-dimensional video, and a third most common region of interest in the three-dimensional video. In some embodiments, the head tracking module 204 may generate user profiles based on demographic information corresponding to the people. For example, the head tracking module 204 may generate a user profile based on age, gender, etc. In some embodiments, the head tracking module 204 may generate a user profile based on physical characteristics. For example, the head tracking module 204 may identify people that move frequently while viewing the three-dimensional video and people that move very little. In some embodiments, the head tracking module 204 generates a user profile for a particular user.

The head tracking module 204 generates a probabilistic model of one or more positions of people that view a three-dimensional video. The probabilistic model identifies a probability of a viewer looking in a particular direction as a function of time. For example, the probabilistic model identifies that a viewer will likely look at a particular object as it moves in the three-dimensional video and that the viewer is unlikely to look direction behind the current location where the viewer is looking.

The head tracking module 204 may generate the probabilistic model on a pixel-by-pixel basis, based on regions in the view, such as a field-of-view, equal-sized divisions of the sphere, etc.

The probabilistic model may include a heat map. For example, the heat map may be rendered as a sequence of false-colored images. In some embodiments, the probabilistic model is displayed as an overlay on top of the three-dimensional video. In some embodiments, the probabilistic model is not displayed but is instead used by the encoder module 210 as described below.

In some embodiments, the parameterization module 208 uses the probabilistic model to determine where one or more people are looking. For example, analysis of one or more probabilistic models may indicate that people frequently look in particular direction when watching a given piece of virtual reality content. Subsequent people may benefit from this information since it may help them to know where they should be looking when watching the virtual reality content. The encoder module 210 may present recommendations to people about where they should be looking when viewing virtual reality content. The recommendations may be audio cues, visual cues or a combination of audio and visual cues. In some embodiments, the visual cues may include blurring every portion of the virtual reality content except for the recommended location where a viewer should be looking.

In some embodiments, the head tracking module 204 may use artificial intelligence to generate a set of probabilistic models from a set of three-dimensional videos. For example, the database 107 stored on the server 120 may include all three-dimensional videos offered by a company that generates virtual reality content. The head tracking module 204 may use head-tracking data from users that view those three-dimensional videos as a training set for generating the set of probabilistic models. The head tracking module 204 may include a neural network that is trained using the set of probabilistic models to determine a probabilistic distribution of viewer gaze.

In some embodiments, the artificial intelligence may be used iteratively, such that each time a new three-dimensional video is generated, the head tracking module 204 uses artificial intelligence (e.g., the neural network) to generate a probabilistic model for the new three-dimensional video. This advantageously results in the creation of probabilistic models for three-dimensional videos that have never been watched.

The segmentation module 206 may include code and routines for generating video segments from the three-dimensional video. In some embodiments, the segmentation module 206 includes a set of instructions executable by the processor 222 to generate the video segments. In some embodiments, the segmentation module 206 is stored in the memory 224 of the computing device 200 and is accessible and executable by the processor 222.

The segmentation module 206 generates video segments from the three-dimensional video. In some embodiments, the segmentation module 206 generates equal-length video segments of a predetermined length. For example, the segmentation module 206 divides a three-minute three-dimensional video into 360 two-second segments. In some embodiments, the segmentation module 206 detects scene boundaries in the three-dimensional video and segments the three-dimensional video based on the scene boundaries. For example, the segmentation module 206 compares a first frame to a next frame to identify differences that indicate a transition between shots. When the segmentation module 206 detects the transition between shots, the segmentation module 206 generates a segment that includes the shot. In some embodiments, the segmentation module 206 may generate segments using a combination of detection of scene boundaries and timing. For example, the segmentation module 206 may first segment the three-dimensional video based on transitions between shots and further segment if any shots exceed a predetermined length of time, such as five seconds.

The parameterization module 208 may include code and routines for generating optimal segment parameters. In some embodiments, the parameterization module 208 includes a set of instructions executable by the processor 222 to generate the optimal segment parameters. In some embodiments, the parameterization module 208 is stored in the memory 224 of the computing device 200 and is accessible and executable by the processor 222.

Three-dimensional video is viewable in all directions. Thus, the three-dimensional video may be modeled by a sphere where a user is in the center of the sphere and may view content from the three-dimensional video in any direction. In some embodiments, the parameterization module 208 converts the locations on the surface of the sphere into a plane. For example, the parameterization module 208 may use a map projection to transform the latitudes and longitudes of locations on the surface of the sphere into locations on a plane. In some embodiments, for each of the video segments, the parameterization module 208 determines a directional encoding format (i.e., a map projection) that projects latitudes and longitudes of locations of the surface of the sphere into locations on the plane. The directional encoding format, i.e., the projection of the latitudes and longitudes of locations of the surface of the sphere may be represented by the following equation:

$$f(\text{yaw},\text{pitch},\text{roll},\text{parameters}) \rightarrow \text{resolution} \qquad \text{Eq. (1a)}$$

where the yaw, pitch, and roll values are obtained from the head-tracking data and/or the probabilistic model. Specifically, the yaw, pitch, and roll values describes a position of a person that is viewing the three-dimensional video as a function of time. The yaw, pitch, and roll values may include head-tracking data that is aggregated for multiple people that view the three-dimensional video. The parameters represent a location in the plane and the resolution is the resolution of the three-dimensional video at a region that corresponds to the yaw, pitch, and roll values.

In some embodiments, the directional encoding format may be represented by the following equation:

$$f(\text{parameters}(\text{pitch},\text{yaw})) \rightarrow \text{resolution} \quad \text{Eq. (1b)}$$

The parameterization module 208 may design a cost function that gives a measure of perceived resolution (e.g., a geometric mean of horizontal and vertical pixels per degree at a display center) for a user gazing in a particular direction at a particular timestamp for a particular set of parameters for the projection. For example, where the latitude/longitude is 0 on the sphere, the particular set of parameters may indicate how biased the encoding is towards its high-resolution region. In some embodiments, the total cost function may be defined as a sum of the individual costs as a function of optimal segment parameters at a particular point in the three-dimensional video.

The parameterization module 208 may set a resolution threshold, such as 10 pixels per degree, that is display and bandwidth-target dependent. If f(parameters) is greater than the resolution threshold, there is no benefit and a cost function that incorporates hinge loss from machine learning may be represented by the following equation:

$$\text{cost}(\text{yaw},\text{pitch},\text{roll},\text{params}) = \max(10 - f(\text{yaw},\text{pitch},\text{roll}, \text{params}), 0) \quad \text{Eq. (2a)}$$

where params represents the optimal segment parameters. The parameterization module 208 uses the cost function to identify a region of interest on the plane based on the head-tracking data and/or the probabilistic model by minimizing a total cost for all users that viewed the three-dimensional video. Persons of ordinary skill in the art will recognize that other cost functions may be used. The parameterization module 208 may generate optimal segment parameters that minimize a sum-over position for the region of interest by applying the cost function. The optimal segment parameters may include a (yaw, pitch) tuple that encodes the region of interest in the video segment. In some embodiments, the parameterization module 208 determines one or more regions of low interest based on the probabilistic model. For example, a region of low interest may include a field-of-view or other division of a three-dimensional video based on the probabilistic model.

In some embodiments, the parameterization module 208 determines multiple directional encodings in each of the video segments for three-dimensional video to identify multiple regions of interest within the three-dimensional video. For example, the head tracking module 204 generates a first user profile and a second user profile and the parameterization module 208 generates first optimal segment parameters associated with the first user profile and second optimal segment parameters associated with the second user profile.

The parameterization module 208 may determine the multiple directional encodings using time-dependent clustering and/or a model that is similar to k-means clustering. The parameterization module 208 may determine n paths in the three-dimensional video where each path represents an independent set of parameters. If n>1, the cost function may be defined as:

$$\text{cost\_multi}(\text{yaw},\text{pitch},\text{roll},\text{parameter\_sets}) = \max([\text{cost}(\text{yaw},\text{pitch},\text{roll},\text{param\_set}) \text{ for param\_set in parameter\_sets}]) \quad \text{Eq. (2b)}$$

In some embodiments, a new directional encoding format may be designed with multiple potential regions of interest. The new directional encoding format may be converted into the above resolution and cost functions.

The encoder module 210 may include code and routines for re-encoding the three-dimensional video. In some embodiments, the encoder module 210 includes a set of instructions executable by the processor 222 to re-encode the three-dimensional video. In some embodiments, the encoder module 210 is stored in the memory 224 of the computing device 200 and is accessible and executable by the processor 222.

The encoder module 210 may re-encode the three-dimensional video to include the optimal segment parameters for each of the video segments. For example, the encoder module 210 may re-encode the three-dimensional video by generating a re-encoded video that includes a high-resolution version of the region of interest and a lower resolution version of the other regions in the re-encoded video. The encoder module 210 may transmit, via the communication unit 226, the re-encoded video and the optimal segment parameters for each of the video segments to the viewing device 115.

In some embodiments, the encoder module 210 re-encodes the three-dimensional video by blurring portions of the three-dimensional video. The encoder module 210 may blur on a pixel-by-pixel basis according to a probability that the viewer is looking at a particular pixel based on the probabilistic model. Alternatively or additionally, the encoder module 210 may blur based on regions of interest or regions of low interest.

In some embodiments, the encoder module 210 blurs each of the video segments with varying intensity such that the intensity of a level of blur increases as the probability of a viewer looking in a particular direction decreases. For example, a video segment with a single moving object may include the region around the moving object optimized to include high resolution, the area surrounding the moving object including slightly lower resolution, the top and bottom of the video segment including significant blur etc.

In some embodiments, the encoder module 210 re-encodes the three-dimensional video to include optimal segment parameters for each of the video segments and/or blurs portions of each of the video segments responsive to a threshold number of people viewing the three-dimensional video. For example, if only two people viewed the three-dimensional video, the head-tracking data generated from those people viewing the three-dimensional video may be insufficient to reliably predict a probability of a viewer looking in a particular location.

The viewing device 115 may receive the re-encoded video and the optimal segment parameters for each of the video segments from the encoder module 210. The viewing device 115 may use the optimal segment parameters for each of the video segments to un-distort the re-encoded video and texture the re-encoded video to the sphere to display the re-encoded video with the region of interest for each of the video segments displayed at a higher resolution that other regions in each of the video segments.

In some embodiments, the encoder module 210 re-encodes the three-dimensional video to include different sets of optimal segment parameters. For example, the head track module 204 may generate a first user profile that reflects a most common region in each of the video segments and a second user profile that reflects a second most common region in each of the video segments. The parameterization module 208 may generate first optimal segment parameters associated with the first user profile and second optimal segment parameters associated with the second user profile. The encoder module 210 may re-encode the three-dimensional video to include the first optimal segment parameters and the second optimal segment parameters for each of the video segments. The encoder module 210 may provide the re-encoded video, the first optimal segment parameters for each of the video segments, and the second optimal segment parameters for each of the video segments to the viewing device 115. The viewing device 115 may un-distort the re-encoded video and texture the re-encoded video to the sphere to display the re-encoded video with two regions of interest for each of the video segments displayed at a higher resolution than other regions in each of the video segments.

In some embodiments, the head-track module 204 may generate multiple user profiles where different people were looking at the same region of interest for a particular video segment. For example, the head-track module 204 may generate different user profiles based on the age of the people that viewed the three-dimensional video. There may be instances where the people in the different age groups looked at the same object in the three-dimensional video because the object was moving fast, making a loud noise, etc. As a result, in some embodiments, the encoder module 210 may re-encode the three-dimensional video to include a single region of interest at a higher resolution than other regions of interest for a video segment even though the re-encoded video is based on multiple sets of segment parameters. In some embodiments where the head-track module 204 generates a user profile for a particular user, the encoder module 210 may re-encode the three-dimensional video for a user based on the user profile for the particular user.

In some embodiments, the encoder module 210 re-encodes the three-dimensional video for use as a two-dimensional video. For example, the encoder module 210 re-encodes the three-dimensional video to include the optimal segment parameters for each of the video segments and provides a re-encoded video and the optimal segment parameters for each of the video segments to the client device 105 or the viewing device 115. The client device 105 may be used for browser-based players that display the two-dimensional video, for example, on a computer screen. The viewing device 115 may be used, for example, when a user wants to switch from an interactive three-dimensional video to an autopilot mode that displays a two-dimensional video that does all the work for the user.

The client device 105 or the viewing device 115 may use the re-encoded video and the optimal segment parameters for each of the video segments to generate a two-dimensional video that automates head movement. The optimal segment parameters for each video segment provide a model for how a user moves while watching the three-dimensional video. The two-dimensional video may automate pitch and yaw movements to simulate the model based on the optimal segment parameters. This may advantageously allow users to view an autopilot mode that automates the three-dimensional movement without having to control the two-dimensional video themselves by using, for example, a mouse, joystick, keys, etc.

In some embodiments, the encoder module 210 generates the two-dimensional video from the three-dimensional video based on the optimal segment parameters. Because the optimal segment parameters for a video segment indicate a region of interest in the video segment, the encoder module 210 may generate a two-dimensional video that depicts head tracking movement as automatic panning within the two-dimensional video. For example, the encoder module 210 may convert a three-dimensional video that includes a bird flying overhead to a two-dimensional video where it appears as if the camera moves overhead to look at the bird, the way a person viewing the three-dimensional video would move. This may advantageously allow a person viewing content on his desktop computer to have a simulated virtual-reality experience.

The encoder module 210 may generate a two-dimensional video from the three-dimensional video that includes multiple optimal segment parameters. For example, the encoder module 210 may generate the two-dimensional video based on multiple user profiles created based on a first most common region of interest and a second most common region of interest, demographics information, etc.

The encoder module 210 may compress the three-dimensional video to generate a stream of compressed three-dimensional video data using video compression techniques. Because portions of the three-dimensional video may include blurring, the three-dimensional video may be more compressible than traditional three-dimensional videos. In some implementations, the aggregation module 202 may encode the stream of three-dimensional video data (or compressed three-dimensional video data) and audio data to form a stream of three-dimensional video. For example, the encoder module 210 may compress the stream of three-dimensional video data using h.264 and the stream of three-dimensional audio data using advanced audio coding (AAC). In another example, the encoder module 210 may compress the stream of three-dimensional video data and the stream of three-dimensional audio data using a standard MPEG format.

The user interface module 212 may include code and routines for generating a user interface. In some embodiments, the user interface module 212 includes a set of instructions executable by the processor 222 to generate the user interface. In some embodiments, the user interface module 212 is stored in the memory 224 of the computing device 200 and is accessible and executable by the processor 222.

In some embodiments, the user interface module 212 may generate a user interface that includes options for manipulating the camera array 101. For example, the user interface may include options for determining whether the camera array 101 starts and stops recording. The user interface may also include an option for viewing a preview of the video data captured by the camera array 101.

The user interface module 212 may generate a user interface that includes options for viewing the three-dimensional video or a two-dimensional video generated from the three-dimensional video. The options may include starting and stopping a video. In some embodiments, the user interface includes a timeline of the video and an option to view the video starting at a section on the timeline.

In some embodiments, the user interface module 212 crops the region of interest for one or more of the video segments based on the optimal segment parameters to form one or more thumbnails of one or more cropped regions of interest. For example, the user interface module 212 may select a predetermined number of regions of interest to crop in the video segments. In some embodiments, the user interface module 212 may determine based on the head-tracking data that regions of interest where a threshold percentage of people looked at the same region of interest that the region of interest qualifies for cropping. For example, if the three-dimensional video includes an explosion and 98% of the people looked at the explosion, the user interface module 212 may determine that the 98% exceeds the threshold percentage of 75% and crop the region of interest. The user interface module 212 may generate a timeline of the three-dimensional video that includes the thumbnails.

Figure 3:
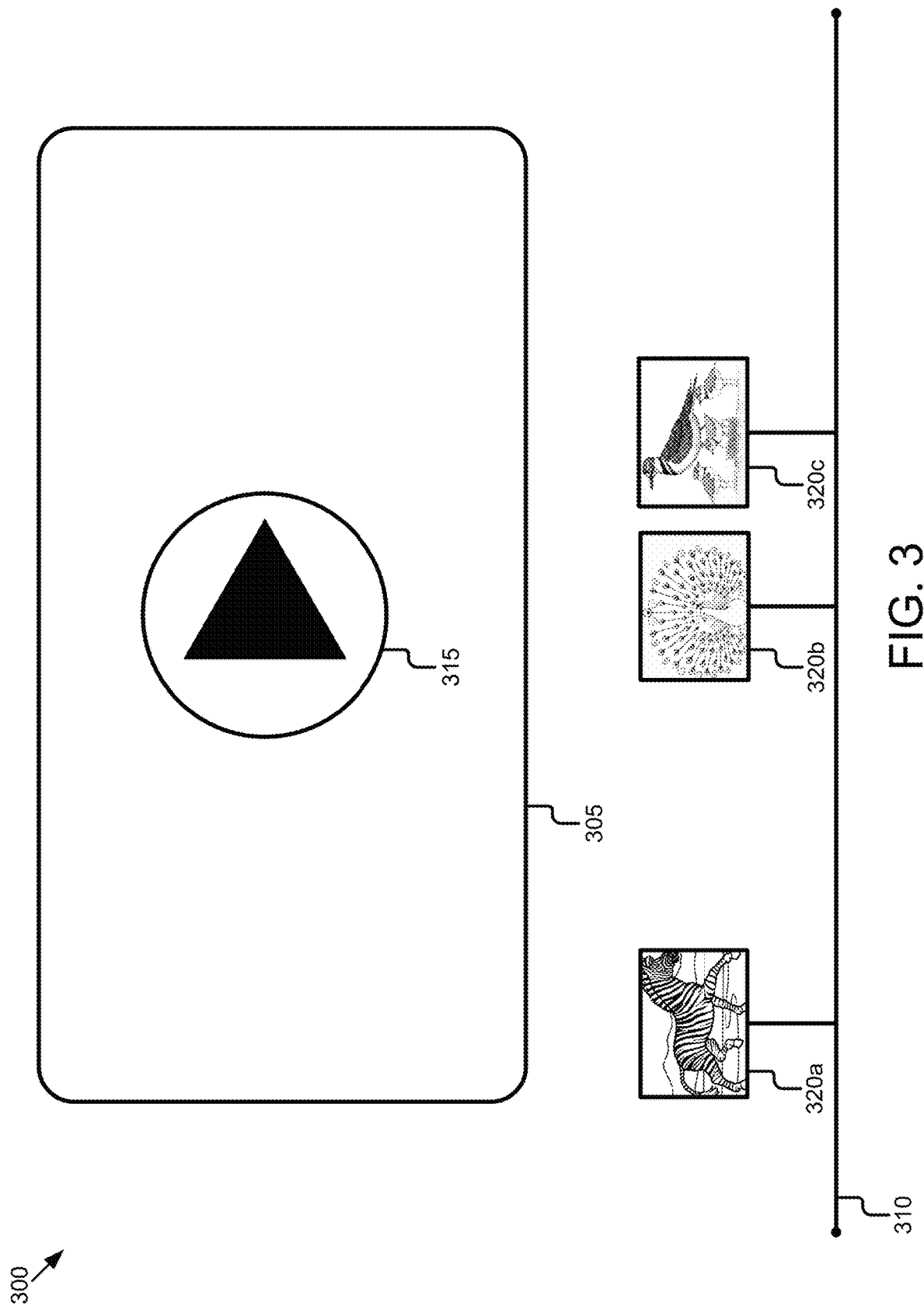
FIG. 3 illustrates an example user interface that includes a timeline of a video with thumbnails according to some embodiments.

Turning to FIG. 3, an example user interface 300 is illustrated that includes a video screen 305 for displaying a video and a timeline 310. The video may be a three-dimensional video or a two-dimensional video generated from the three-dimensional video. The video screen 305 includes a play button 315 for starting the video. The timeline 310 includes three thumbnails 320: a first thumbnail 320*a* of a zebra, a second thumbnail 320*b* of a peacock, and a third thumbnail 320*c* of a killdeer. The thumbnails 320 (320*a*, 320*b*, 320*c*) include a cropped version of the regions of interest in the video. The user interface module 212 generated the three thumbnails based on a percentage of people viewing the region of interest in each of the video segments exceeding a threshold percentage.

In some embodiments, the user interface module 212 generates a user interface that include an option for the user to modify the two-dimensional video. In some embodiments where multiple user profiles are available (e.g., a first user profile and a second user profile), the user interface may include an option to switch from the first user profile to the second user profile. In this example, the client device 105 may switch from using the re-encoded video and first optimal segment parameters to using the re-encoded video and second optimal segment parameters to generate the two-dimensional video. In some embodiments, the user interface may provide descriptions for different user profiles, such as most common for the most common regions of interest, second most common, slow movement for head-tracking data associated with people that move slowly while viewing the three-dimensional video, fast movement for head-tracking data associated with people that move quickly while viewing the three-dimensional video, etc.

In some embodiments, the user interface may include an option for the user to modify the two-dimensional video by directly inputting a pitch and yaw. For example, where the user is viewing the two-dimensional video on a client device 105, the user may use a pointing device, such as a mouse, to select a region of interest in the two-dimensional video. The client device 105 may identify the pitch and yaw associated with the region of interest that the user selected. The client device 105 may use the pitch and yaw as optimal segment parameters to modify the two-dimensional video, for example, by displaying more detail for the selected region of interest. In some embodiments, the client device 105 may identify movement associated with the selection. For example, the client device 105 may identify mouse movement in an upward direction. The client device 105 may, as a result, display the two-dimensional video as panning upwards.

In another example, the user may directly input the pitch and yaw based on gyroscopic input. For example, if a user is viewing the two-dimensional video on a viewing device 115, the user's head may move upwards. A gyroscope associated with the viewing device 115 may detect the upward movement and modify the two-dimensional view to display the two-dimensional video as panning upwards. In yet another embodiment, the client device 105 may be a mobile device, such as a smartphone, that includes a gyroscope that detects a user rotating the client device 105 to simulate upward movement. The client device 105 may modify the two-dimensional view to display the two-dimensional video as panning upwards based on the user rotating the client device 105.

Example Flow Diagrams

Figure 4:
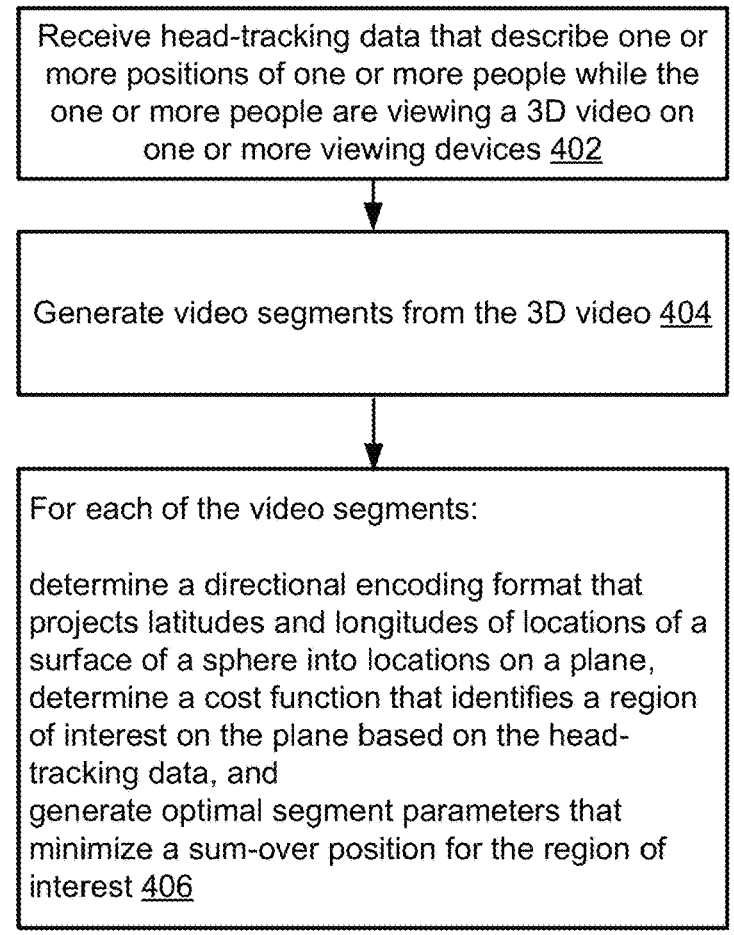
FIG. 4 illustrates an example flow diagram for generating optimal segment parameters for a three-dimensional video according to some embodiments.

FIG. 4 illustrates an example flow diagram 400 for generating three-dimensional video according to some embodiments. The steps in FIG. 4 may be performed by the virtual reality application 103*a* stored on the client device 105, the virtual reality application 103*b* stored on the server 120, or a combination of the virtual reality application 103*a* stored on the client device 105 and the virtual reality application 103*b* the server 120.

At step 402, head-tracking data is received that describes one or more positions of one or more people while the one or more people are viewing a three-dimensional video (3D) on one or more viewing devices 115. At step 404, video segments are generated for the three-dimensional video. For example, the three-dimensional video may be divided into video segments that are each two seconds long. At step 406, for each of the video segments, a directional encoding format is determined that projects latitudes and longitudes of locations of a surface of a sphere into locations on a plane, a cost function is determined that identifies a region of interest on the plane based on the head-tracking data, and optimal segment parameters are generated that minimize a sum-over position for the region of interest.

The separation of various components and servers in the embodiments described herein should not be understood as requiring such separation in all embodiments, and it should be understood that the described components and servers may generally be integrated together in a single component or server. Additions, modifications, or omissions may be made to the illustrated embodiment without departing from the scope of the present disclosure, as will be appreciated in view of the disclosure.

FIG. 5 illustrates an example flow diagram 500 for re-encoding a three-dimensional video with blurred portions. The steps in FIG. 5 may be performed by the virtual reality application 103*a* stored on the client device 105, the virtual reality application 103*b* stored on the server 120, or a combination of the virtual reality application 103*a* stored on the client device 105 and the virtual reality application 103*b* the server 120.

At step 502, head-tracking data is received that describes one or more positions of people while the people are viewing a three-dimensional video on viewing devices 115. At step 504, a probabilistic model of the one or more positions of the people is generated based on the head-tracking data, where the probabilistic model identifies a probability of a viewer looking in a particular direction as a function of time. For example, the probabilistic model may include a heat map that includes a visual representation of the probability that a viewer is looking in a particular direction as a function of time.

At step 506, video segments are generated from the three-dimensional video. At step 508, for each of the video segments: determine a directional encoding format that projects latitudes and longitudes of locations of a surface of a sphere onto locations on a plane, determine a cost function that identifies a region of interest on the plane based on the probabilistic model, generate optimal segment parameters that minimize a sum-over position for the region of interest, and identify a probability of a viewer looking in a particular direction as a function of time based on the probabilistic model.

At step 510, the three-dimensional video is re-encoded to include the optimal segment parameters for each of the video segments and to blur portions of each of the video segments based on the probability, where an intensity of a level of blur increases as the probability of the viewer looking in the particular direction decreases.

Figure 6:
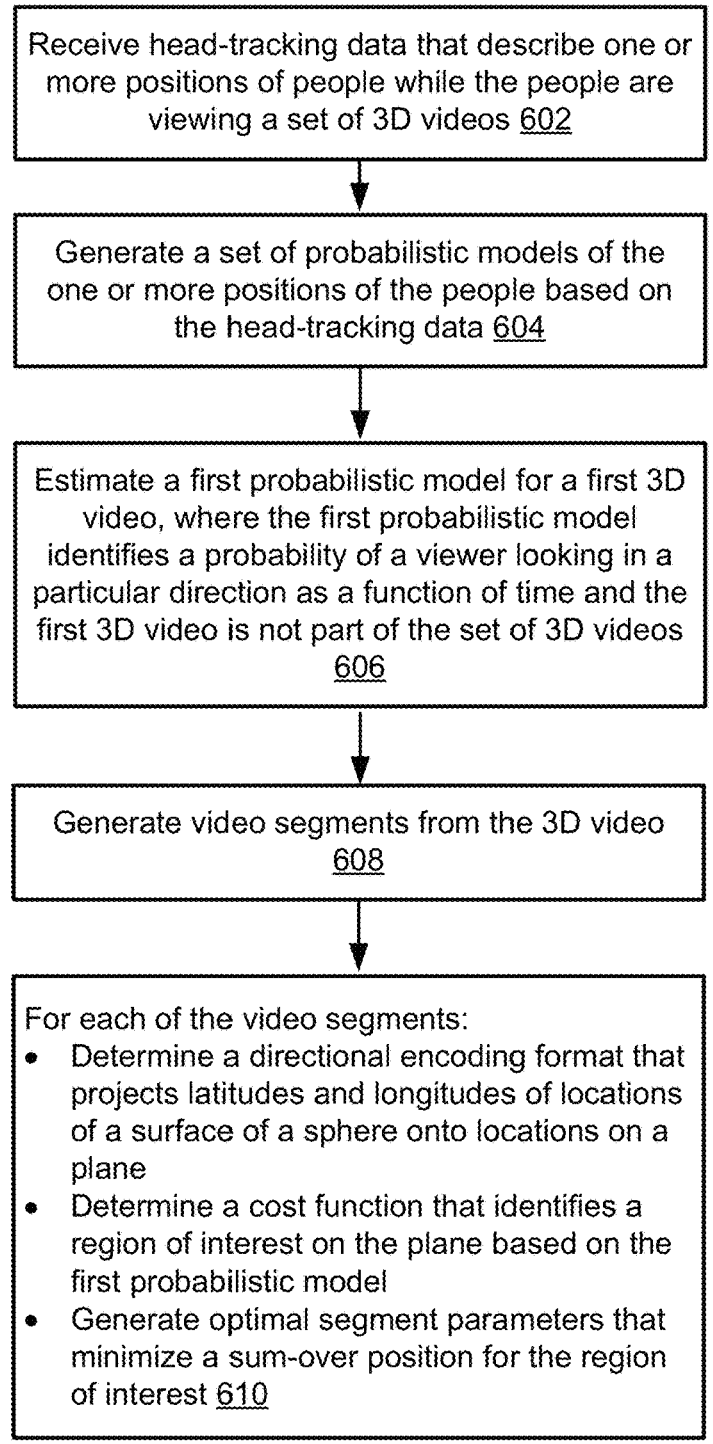
FIG. 6 illustrates an example flow diagram for generating optimal segment parameters and a probabilistic model from a training set.

FIG. 6 illustrates an example flow diagram 600 for generating optimal segment parameters and a probabilistic model from a training set. The steps in FIG. 6 may be performed by the virtual reality application 103a stored on the client device 105, the virtual reality application 103b stored on the server 120, or a combination of the virtual reality application 103a stored on the client device 105 and the virtual reality application 103b the server 120.

At step 602, head-tracking data is received that describes one or more positions of people while the people are viewing a set of three-dimensional videos. For example, the set of three-dimensional videos may include all the three-dimensional videos associated with a company that produces virtual-reality content. The company may provide the set of three-dimensional videos to users and receive, after receiving user consent, the head-track data after the users watch the virtual reality content.

At step 604, a set of probabilistic models is generated of the one or more positions of the people based on the head-tracking data. For example, the set of probabilistic models describe the probability of a viewer looking in a particular direction for a corresponding three-dimensional video.

At step 606, a first probabilistic model for a first three-dimensional video is estimated, where the first three-dimensional video is not part of the set of three-dimensional videos. For example, the set of three-dimensional videos serve as a training set for a neural network that can estimate the probability of a viewer looking in a particular direction in the first three-dimensional video. This advantageously allows the first probabilistic model to be generated without the expense associated with having people view the first three-dimensional video to generate the first probabilistic model.

At step 608, for each of the video segments: a directional encoding format is determined that projects latitudes and longitudes of locations of a surface of a sphere onto locations on a plane, a cost function is determined that identifies a region of interest on the plane based on the first probabilistic model, optimal segment parameters are generated that minimize a sum-over position for the region of interest, and a probability is identified of a viewer looking in a particular direction as a function of time based on the first probabilistic model.

Embodiments described herein contemplate various additions, modifications, and/or omissions to the above-described panoptic virtual presence system, which has been described by way of example only. Accordingly, the above-described camera system should not be construed as limiting. For example, the camera system described with respect to FIG. 1 below may include additional and/or different components or functionality than described above without departing from the scope of the disclosure.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the inventions have been described in detail, it may be understood that the various changes, substitutions, and alterations could be made hereto without departing from the spirit and scope of the invention.

What is claimed is:

1. A method comprising:
receiving head-tracking data that describe one or more positions of people while the people are viewing a three-dimensional video;
generating a probabilistic model of the one or more positions of the people based on the head-tracking data, wherein the probabilistic model identifies a probability of a viewer looking in a particular direction as a function of time;
generating video segments from the three-dimensional video;
for each of the video segments:
determining a directional encoding format that projects latitudes and longitudes of locations of a surface of a sphere onto locations on a plane;

determining a cost function that identifies a region of interest on the plane based on the probabilistic model; and generating optimal segment parameters that minimize a sum-over position for the region of interest; and re-encoding the three-dimensional video to include the optimal segment parameters for each of the video segments and to modify portions of each of the video segments based on the probability of the viewer looking in the particular direction as the function of time.

2. The method of claim 1, further comprising providing, based on the re-encoding of the three-dimensional video, a re-encoded video and the optimal segment parameters for each of the video segments to a viewing device, wherein the viewing device uses the optimal segment parameters for each of the video segments to un-distort the re-encoded video and texture the re-encoded video to the sphere to display the re-encoded video with the region of interest for each of the video segments displayed at a higher resolution than other regions in each of the video segments.

3. The method of claim 1, wherein the re-encoding of the three-dimensional is performed in response to a threshold number of the people viewing the three-dimensional video.

4. The method of claim 1, wherein the re-encoding of the three-dimensional video includes modifying portions of each of the video segments by blurring portions of each of the video segments based on the probability.

5. The method of claim 4, wherein an intensity of a level of blur increases as the probability of the viewer looking in the particular direction decreases.

6. The method of claim 4, further comprising identifying a region of low interest for each of the video segments, wherein:
the blurring of the portions of each of the video segments includes blurring the region of low interest; and
the region of low interest is displayed at a lower resolution that other regions in each of the video segments.

7. The method of claim 1, further comprising providing the re-encoded video and the optimal segment parameters for each of the video segments to a client device, wherein the client device uses the re-encoded video and the optimal segment parameters for each of the video segments to generate a two-dimensional video that automates head movement.

8. The method of claim 1, wherein the probabilistic model is a heat map.

9. A system comprising:
a processor coupled to a memory;
a head tracking module stored in the memory and executable by the processor, the head tracking module configured to receive head-tracking data that describe one or more positions of people while the people are viewing a set of three-dimensional videos, generate a set of probabilistic models of the one or more positions of the people based on the head-tracking data, and estimate a first probabilistic model for a three-dimensional video, wherein the first probabilistic model identifies a probability of a viewer looking in a particular direction as a function of time and the three-dimensional video is not part of the set of three-dimensional videos;
a segmentation module stored in the memory and executable by the processor, the segmentation module configured to generate video segments from the three-dimensional video;
a parameterization module stored in the memory and executable by the processor, the parameterization module configured to, for each of the video segments:
determine a directional encoding format that projects latitudes and longitudes of locations of a surface of a sphere onto locations on a plane;
determine a cost function that identifies a region of interest on the plane based on the first probabilistic model; and
generate optimal segment parameters that minimize a sum-over position for the region of interest; and
an encoder module stored in the memory and executable by the processor, the encoder module configured to re-encode the three-dimensional video to include the optimal segment parameters for each of the video segments and modify of each of the video segments based on the probability of the viewer looking in the particular direction as the function of time.

10. The system of claim 9, wherein the encoder module is further configured to provide, based on the re-encoding of the three-dimensional video, a re-encoded video and the optimal segment parameters for each of the video segments to a client device, wherein the client device uses the re-encoded video and the optimal segment parameters for each of the video segments to generate a two-dimensional video that automates head movement.

11. The system of claim 9, wherein the first probabilistic model is a heat map.

12. The system of claim 9, wherein the re-encoding of the three-dimensional video includes modifying portions of each of the video segments by blurring portions of each of the video segments based on the probability.

13. The system of claim 12, wherein the encoder module is further configured to provide a recommendation of where to look by blurring every portion of the re-encoded video except for a location in the re-encoded video where a viewer is recommended to look.

14. The system of claim 12, wherein the re-encoding of the three-dimensional is performed in response to a threshold number of the people viewing the three-dimensional video.

15. The system of claim 12, further comprising a user interface module stored in the memory and executable by the processor, the user interface module configured to crop the region of interest for one or more video segments based on the optimal segment parameters to form one or more thumbnails of one or more cropped regions of interest and generate a timeline of the three-dimensional video with the one or more thumbnails.

16. A non-transitory computer readable storage medium storing instructions that, when executed by a processor, cause the processor to:
receive head-tracking data that describes one or more positions of people while the people are viewing a three-dimensional video;
generate a probabilistic model of the one or more positions of the people based on the head-tracking data, wherein the probabilistic model identifies a probability of a viewer looking in a particular direction as a function of time;
generate video segments from the three-dimensional video;
for each of the video segments:
determine a directional encoding format that projects latitudes and longitudes of locations of a surface of a sphere onto locations on a plane;

determine a cost function that identifies a region of interest on the plane based on the probabilistic model;

generate optimal segment parameters that minimize a sum-over position for the region of interest; and identify a region of low interest; and re-encode the three-dimensional video to include the optimal segment parameters for each of the video segments and to modify the region of low interest based on the probability of the viewer looking in the particular direction as the function of time.

17. The non-transitory computer readable storage medium of claim 16, wherein the processor is further configured to provide, based on the re-encoding of the three-dimensional video, a re-encoded video and the optimal segment parameters for each of the video segments to a viewing device, wherein the viewing device uses the optimal segment parameters for each of the video segments to un-distort the re-encoded video and texture the re-encoded video to the sphere to display the re-encoded video with the region of interest for each of the video segments displayed at a higher resolution than other regions in each of the video segments and the region of low interest displayed at a lower resolution than other regions in each of the video segments.

18. The non-transitory computer readable storage medium of claim 16, wherein the probabilistic model is a heat map.

19. The non-transitory computer readable storage medium of claim 16, wherein the re-encoding of the three-dimensional video includes modifying portions of each of the video segments by blurring portions of each of the video segments based on the probability.

20. The non-transitory computer readable storage medium of claim 19, wherein the re-encoding of the three-dimensional is performed in response to a threshold number of the people viewing the three-dimensional video.

* * * * *